United States Patent
Ghaed et al.

(10) Patent No.: US 9,635,147 B2
(45) Date of Patent: Apr. 25, 2017

(54) PROTOCOL FOR AN ELECTRONIC DEVICE TO RECEIVE A DATA PACKET FROM AN EXTERNAL DEVICE

(71) Applicant: THE REGENTS OF THE UNIVERSITY OF MICHIGAN, Ann Arbor, MI (US)

(72) Inventors: Mohammad Hassan Ghaed, Ann Arbor, MI (US); Skylar Skrzyniarz, Ann Arbor, MI (US); David Theodore Blaauw, Ann Arbor, MI (US); Dennis Michael Sylvester, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 161 days.

(21) Appl. No.: 14/326,684

(22) Filed: Jul. 9, 2014

(65) Prior Publication Data

US 2016/0014240 A1  Jan. 14, 2016

(51) Int. Cl.
*H04B 1/034* (2006.01)
*H04L 29/06* (2006.01)
(Continued)

(52) U.S. Cl.
CPC .............. *H04L 69/22* (2013.01); *H04W 4/008* (2013.01); *H04W 52/0209* (2013.01); *Y02B 60/50* (2013.01)

(58) Field of Classification Search
CPC ............... H04W 56/001; H04W 4/008; H04W 52/0209; H04L 69/22; H04B 1/034
(Continued)

(56) References Cited

U.S. PATENT DOCUMENTS

| 6,582,365 | B1 | 6/2003 | Hines |
| 7,359,753 | B2 * | 4/2008 | Bange ................ A61N 1/37223 607/60 |

(Continued)

FOREIGN PATENT DOCUMENTS

| CN | 202050408 | 11/2011 |
| CN | 202694400 | 1/2013 |

(Continued)

OTHER PUBLICATIONS

Chen, G.; Ghaed, H.; Hague, R.; Wieckowski, M.; Yejoong Kim; Gyouho Kim; Fick, D.; Daeyeon Kim; Mingoo Seok; Wise, K.; Blaauw, D.; Sylvester, D., "A cubic-millimeter energy-autonomous wireless intraocular pressure monitor," Solid-State Circuits Conference Digest of Technical Papers (ISSCC), 2011 IEEE International , vol., No., pp. 310,312, Feb. 20-24, 2011.

(Continued)

*Primary Examiner* — Andrew Chriss
*Assistant Examiner* — Voster Preval
(74) *Attorney, Agent, or Firm* — Pramudji Law Group PLLC; Ari Pramudji (57) ABSTRACT

A protocol for transmitting data from an external device to an electronic device is provided in which the external device transmits a data stream which includes the same data packet repeated multiple times. The data packet has a predetermined length and has a header portion at a predetermined position. A receiver at the electronic device captures a block of data having the predetermined length from the transmitted data stream, and a decoder rotates the captured block of data to place the header portion at the predetermined position within the data packet. This eliminates the need for an accurate jitter-free clock reference at the electronic device. By shifting power consumption and system complexity to the external unit where power is typically not constrained, (Continued)

the energy efficiency of the electronic device can be increased.

20 Claims, 6 Drawing Sheets

(51) Int. Cl.
*H04W 4/00* (2009.01)
*H04W 52/02* (2009.01)

(58) Field of Classification Search
USPC .......................................... 370/250, 350, 349
See application file for complete search history.

(56) References Cited

U.S. PATENT DOCUMENTS

| | | | |
|---|---|---|---|
| 2001/0007335 | A1 | 7/2001 | Tuttle et al. |
| 2004/0155790 | A1* | 8/2004 | Tsuji ................... H04W 74/04 340/4.21 |
| 2005/0240245 | A1* | 10/2005 | Bange ................ A61N 1/37223 607/60 |
| 2008/0310395 | A1* | 12/2008 | Kashima .............. H04L 1/1896 370/350 |
| 2009/0248116 | A1 | 10/2009 | Le Reverend et al. |
| 2010/0198039 | A1 | 8/2010 | Towe |
| 2010/0204766 | A1 | 8/2010 | Zdeblick et al. |
| 2012/0312879 | A1 | 12/2012 | Rolin et al. |
| 2013/0070616 | A1* | 3/2013 | Lee ..................... H04W 56/001 370/250 |
| 2013/0343248 | A1* | 12/2013 | Toner ................ H04W 56/0085 370/311 |
| 2014/0286174 | A1* | 9/2014 | Iizuka ..................... H04L 43/12 370/241 |
| 2015/0098375 | A1* | 4/2015 | Ree .................. H04W 52/0296 370/311 |
| 2016/0183799 | A1* | 6/2016 | San Vicente ......... A61B 5/0026 340/870.07 |

FOREIGN PATENT DOCUMENTS

| | | |
|---|---|---|
| CN | 103036588 | 4/2013 |
| CN | 202906898 | 4/2013 |
| CN | 203039683 | 7/2013 |
| JP | 2005-303570 | 10/2005 |

OTHER PUBLICATIONS

Yeager, D.; Fan Zhang; Zarrasvand, A.; Otis, B.P., "A 9.2μA gen 2 compatible UHF RFID sensing tag with −12dBm Sensitivity and 1.25μVrms input-referred noise floor," Solid-State Circuits Conference Digest of Technical Papers (ISSCC), 2010 IEEE International , vol., No., pp. 52,53, Feb. 7-11, 2010.

Darwhekar, Y.; Braginskiy, E.; Levy, K.; Agrawal, A.; Singh, V.; Issac, R.; Blonskey, O.; Adler, O.; Benkuzari, Y.; Ben-Shachar, M.; Manian, S.; Sivadas, A.; Mukherjee, S.; Burra, G.; Tal, N.; Shlivinski, Y.; Bitton, G.; Samala, S., "A 45nm CMOS near-field communication radio with 0.15A/m RX sensitivity and 4mA current consumption in card emulation mode," Solid-State Circuits Conference Digest of Technical Papers (ISSCC), 2013 IEEE International , vol., No., pp. 440,441, Feb. 17-21, 2013.

Seulki Lee; Long Yan; Taehwan Roh; Sunjoo Hong; Hoi-Jun Yoo, "A 75μW real-time scalable network controller and a 25μW ExG sensor IC for compact sleep-monitoring applications," Solid-State Circuits Conference Digest of Technical Papers (ISSCC), 2011 IEEE International , vol., No., pp. 36,38, Feb. 20-24, 2011.

Inanlou, F.; Kiani, M.; Ghovanloo, M., "A 10.2 Mbps Pulse Harmonic Modulation Based Transceiver for Implantable Medical Devices," Solid-State Circuits, IEEE Journal of , vol. 46, No. 6, pp. 1296,1306, Jun. 2011.

* cited by examiner

PROTOCOL FOR AN ELECTRONIC DEVICE TO RECEIVE A DATA PACKET FROM AN EXTERNAL DEVICE

BACKGROUND

Technical Field

The present technique relates to the field of electronic devices. More particularly, it relates to a technique for receiving a data packet from an external device.

Technical Background

There is an increasing demand for electronic devices which are both very small and energy efficient. For example, wireless sensor nodes which can communicate at relatively short range with an external device are in demand for biomedical applications such as intracranial, intraocular, or cardiac sensors which can be embedded in the body for transmitting sensing data to external device. For such a device, there are severe constraints on both the amount of energy available for the device and the peak current which can be supplied to the radio transmitter/receiver. For example, it may not be practical to replace a battery in a device that is implanted in the body, and the device may need to function for a long period of time, so energy efficiency may be important. Many current protocols for communicating with such a device require an accurate jitter-free timing reference, which is expensive in terms of energy. The present technique seeks to address this problem.

SUMMARY OF THE PRESENT TECHNIQUE

Viewed from one aspect, the present technique provides an electronic device for receiving a data packet from an external device transmitting a data stream comprising the same data packet repeated a plurality of times, the data packet having a predetermined packet length and comprising a header portion at a predetermined position within the data packet; the electronic device comprising:

a receiver configured to receive data from the external device;

a control unit configured to control the receiver to capture a block of data having the predetermined packet length from the data stream transmitted by the external device; and a decoder configured to rotate the captured block of data to place the header portion at the predetermined position within the data packet.

A communication protocol is provided for an electronic device to receive a data packet from an external device. The external device transmits a data stream which comprises the same data packet repeated a multiple times. The data packet has a predetermined packet length and has a header portion at a predetermined position within the data packet. On receiving the data stream, a control unit in the electronic device controls the receiver to capture a block of data having the predetermined packet length from the data stream transmitted by the external device. The control unit does not need to wait for a header portion before capturing the block of data. Instead, it may capture from the data stream any block of data having the predetermined packet length. Since the data stream from the external device has the same data packet repeated continuously, the original packet can then be reconstructed using a decoder which rotates the captured block of data to place the header portion at the predetermined position within the packet.

This approach may seem counterintuitive, since transmitting the same data packet many times from the external device will increase the power consumed by the external device, and increase the amount of bandwidth used, and reduce the bit rate available. However, the inventors of the present technique recognised that in many wireless sensor node applications there is not typically a significant power or energy constraint at the external device and so by shifting power consumption and system complexity to the external device side, the electronic device itself can be made very energy efficient. As it is not necessary to locate the header portion of the packet before starting the capture window for capturing the packet, the receiver of the electronic device can be active for a shorter period of time in order to capture the data packet, reducing energy consumption. Also, since the data packet can be captured and rotated into the correct format regardless of the timing of the capture window relative to the data stream, there is no need for an accurate timing reference clock or jitter free clock, which incurs an energy cost.

The receiver may have an active state for receiving data and a power saving state in which data cannot be received. The control unit may control the receiver to switch from the power saving state to the active state, capture a block of data having the predetermined packet length and then switch back to the power saving state. In this way, the receiver may be active for a length of time corresponding to the predetermined packet length and does not need to be active for any longer.

The electronic device may also have a transmitter for transmitting data to the external device. When the data packet has been received, the control unit may control the transmitter to transmit a packet acknowledgment to the external device. In a similar way to the receiver, the transmitter may have an active state and a power saving state and may switch to the active state for transmitting the packet acknowledgment before switching back to the power saving state. For example, the power saving state of the receiver or the transmitter may be implemented using one or more power gates which selectively isolate the receiver or transmitter from a power supply.

The packet acknowledgement may be used to signal that the electronic device has received the current data packet and is ready for receiving another data packet. When the acknowledgement is received by the external device, it may send a second data stream which includes a second data packet repeated a plurality of times, again having the same predetermined packet length and comprising a header portion at a predetermined position of the packet. The receiver may capture a second block of data having the predetermined packet length from the second data stream, and rotate the second block into the required format with the header at the predetermined position, and transmit another packet acknowledgement to indicate that it has received the second packet. Hence, the electronic device and the external device may communicate using a half-duplex communication protocol, in which only one device is transmitting at a time, and where the external device waits for an acknowledgement from the electronic device before proceeding to the next data packet. This eliminates the need for timing synchronization between the two devices and so energy can be conserved.

The control unit may control the transmitter to delay sending the packet acknowledgement to the external device until a delay period has elapsed after receiving the data packet. This is useful for several reasons. Firstly, the delay provides time for energy to be harvested by an energy harvesting unit, or charge to be accumulated in a charge reservoir, to provide enough energy to power the transmitter, which is useful since the energy or charge may have been depleted following the receiver capturing the data packet.

Also, the delay period can be used to signal information to the external device in a simple and energy efficient way. The control unit may vary the duration of the delay period to signal a piece of information, such as whether or not errors have been detected in the received data packet, for example. For example, if the delay period has a first duration then this may indicate that no errors have been detected and that the external device should now proceed with the next data packet, while if the delay period has a second duration then this may indicate that at least one error has been detected in the received data packet, to trigger the external device to resend the current packet. By using a variable delay period to signal information, it is not necessary to for the electronic device to modify the contents of the acknowledgment message, to reduce the energy overhead.

The predetermined position, at which the header portion is located within the data packet sent from the external device, may be any position within the data packet. However, often it may be convenient for the header portion to be positioned at the start of the data packet. Nevertheless, it is also possible for the header portion to be at an arbitrary position within the packet, e.g. within the middle or at the end of the packet.

The header portion may have a unique value which cannot occur during the remainder of the data packet. This allows the decoder to distinguish the header portion from other data so that the packet can be rotated to the appropriate position. For example, the data stream may comprise Manchester encoded data, in which bit values 0, 1 are encoded as rising or falling transitions of a signal. In Manchester encoding, each valid bit period includes at least one transition of the signal and bit periods when there are no transitions are considered invalid, so cannot occur in the data portion of the data packet. The header portion may use a series of values including such an invalid encoding to mark the predetermined position of the data packet.

In some cases, before receiving the data packet, the electronic device and external device may exchange messages to signal that the devices are ready for the data packet transmission. Hence, the control unit may control the receiver to detect a beacon transmitted from the external device signalling that the external device is ready to transmit a data packet, and in response to detecting the beacon, may control the transmitter to transmit a beacon acknowledgment to signal that the electronic device is ready to receive the data packet. This can be useful for energy saving to allow the electronic device to enter deeper power saving modes in which less energy is consumed. When the external device wishes to communicate with the electronic device, the external device can periodically send beacon messages to the electronic device, until the electronic device responds. The electronic device may periodically be woken up from the sleep mode to an active mode, check whether a beacon has been transmitted from the external device, and if no beacon is detected switch back to sleep mode to save energy. If a beacon has been detected then a beacon acknowledgement can be sent to the external device. The external device may continue to transmit beacons until it receives an acknowledgment, and then to transmits the data stream including the repeated data packet as discussed above.

The device may have a charge reservoir for supplying power to the receiver. For example the charge reservoir may be a capacitor which can be charged with power supplied by a battery or an energy harvesting unit for harvesting ambient energy (e.g. a solar cell, thermoelectric device or piezoelectric device). This is particularly useful where the charge reservoir is charged from a small battery such as thin film battery which can only provide a limited amount of current. By accumulating charge in the charge reservoir, this enables a greater current to be supplied to the transmitter or receiver, which may not be able to function based on the smaller current supplied directly from the battery. However, powering the transmitter or receiver from the charge reservoir limits the length of time for which the transmitter or receiver can be continuously active before the charge in the charge reservoir is depleted. The present technique is very useful for a device having a charge reservoir, because it enables the electronic device to communicate with the external device using short bursts of activity at the transmitter or receiver, allowing time for replenishing the charge reservoir in between. Also, by reducing the amount of time for which the receiver has to be active to capture the data packet and avoiding the need to scan the receive stream for the header portion before capturing the data packet, the present technique allows more efficient use of the charge stalled by the charge reservoir. This means that the same amount of charge can support a greater transmission/reception power, so that the electronic device can communicate with the external device over an increased distance. For example, by using the protocol discussed above, a receiver has been built which is the first ever millimeter-sized receiver which can achieve 1 meter of range while running off a mm-sized thin-film battery.

In general, after each data packet has been received by the receiver, or after each time an acknowledgement has been transmitted from the transmitter, the control unit may control the charge reservoir to be recharged from the battery. Hence, there may be a delay before the next reception or transmission while the charge reservoir is being recharged.

Viewed from another aspect, the present technique provides an electronic device for receiving a data packet from an external device transmitting a data stream comprising the same data packet repeated a plurality of times, the data packet having a predetermined packet length and comprising a header portion at a predetermined position within the data packet; the electronic device comprising:

receiving means for receiving data from the external device;

control means for controlling the receiver to capture a block of data having the predetermined packet length from the data stream transmitted by the external device; and decoding means for rotating the captured block of data to place the header portion at the predetermined position within the data packet.

Viewed from a further aspect, the present technique provides a transmitting device for transmitting a data packet to an electronic device, the transmitting device comprising:

a transmitter configured to transmit data to the electronic device; and a control unit configured to control the transmitter;

wherein the control unit is configured to control the transmitter to transmit a data stream comprising the same data packet repeated a plurality of times, the data packet having a predetermined packet length and comprising a header portion at a predetermined position within the data packet.

Hence, the transmitting device incurs increased energy cost and uses more bandwidth for the transmission by repeating the same data packet several. However, this is preferable because this allows significant energy savings at the electronic device side by eliminating the need for accurate timing synchronisation with a jitter-free clock and reducing the length of the receiver capture window.

Viewed from another aspect, the present technique provides a transmitting device for transmitting a data packet to an electronic device, the transmitting device comprising:

transmitting means for transmitting data to the electronic device; and control means for controlling the transmitting means;

wherein the control means is configured to control the transmitting means to transmit a data stream comprising the same data packet repeated a plurality of times, the data packet having a predetermined packet length and comprising a header portion at a predetermined position within the data packet.

Viewed from a further aspect, the present technique provides a method of transmitting a data packet from an external device to an electronic device, the method comprising:

the external device transmitting a data stream comprising the same data packet repeated a plurality of times, the data packet having a predetermined packet length and comprising a header portion at a predetermined position within the data packet; and the electronic device capturing a block of data having the predetermined packet length from the data stream transmitted by the external device, and rotating the block of data to place the header portion at the predetermined position within the data packet.

Further aspects, features and advantages of the present technique are described below with reference to the drawings.

DESCRIPTION OF EXAMPLES

Short communication range wireless sensor nodes are in great demand for intracranial, intraocular and cardiac applications, among others. One differentiating feature of such nodes is their highly miniaturized form factors, often in the mm range. As a result, the substantial work in low power RFID is incompatible with this emerging class of devices due to the large antennas of RFID card-type devices. Current near-field solutions require large peak currents not feasible in such systems. Very small (1-10 $mm^2$) thin-film batteries offer a reliable power source for such systems. While their 10-50 mJ capacities are sufficient for the transmission of several Mb between battery recharges (at 1 nJ/bit), their peak output current of 10-50 µA is inconsistent with RF blocks (mA range). Therefore, these blocks may operate using a capacitive charge reservoir (nF range) that is recharged between radio transmissions. However, ms range recharge times reduce bit rate and place tighter requirements on timing reference jitter in order to maintain synchronization throughout the longer communication process. This in turn increases timing reference power (typically integrated on-chip), which can then come to dominate overall power consumption. Further, given the limited charge reservoir, the receiver start-up time/energy becomes critical. Conventional methods with start-up times of 10 s will fully deplete a 10 nF capacitor at 5V (assuming a 5 mA receiver). To address this gap, we propose, for example, a 2.5 $mm^2$ near-field transceiver with integrated coils that uses a novel analog front-end and transmission protocol to relax synchronization requirements on the receive side. In one embodiment, it uses a 14.3 nF charge reservoir and requires 19.9 µA peak current. The front-end uses a new fast-startup scheme to minimize start-up overhead and a new dual-coil LNA structure to maximize inductive coupling. The transceiver consumes 42.7 nA during monitoring mode and 19.9 µA at 40.7 kbps during active mode, drawn from a custom 2 $mm^2$ 3.6V thin-film battery suitable for 3D stacking with the radio die.

Figure 1:
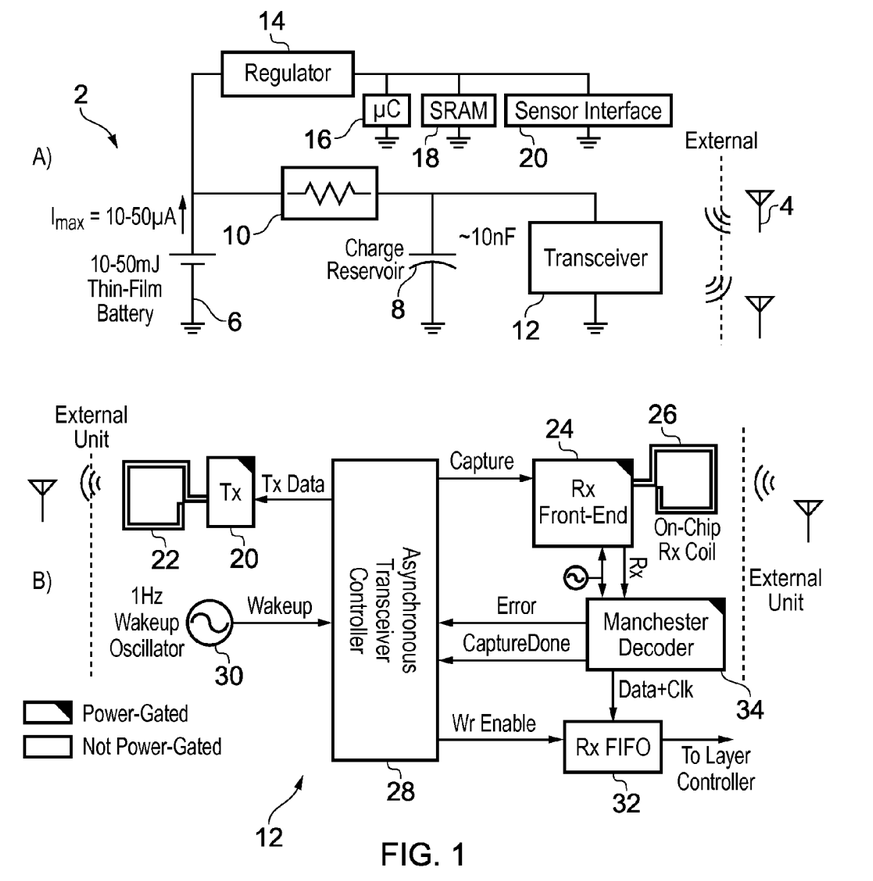
FIG. 1 schematically illustrates an example of an electronic device for receiving data from an external device.

Part A of FIG. 1 illustrates an example of an electronic device 2 for receiving data from an external unit 4. The device 2 has a battery 6, which is a thin film battery in this example, which provides relatively low current. A charge reservoir 8 is provided in the form of a capacitor 8 which can selectively be charged with energy from the battery 6 under control of a variable resistor 10. A transceiver 12 is supplied with a voltage from the charge reservoir 8. The transceiver 12 receives data from an external unit 4 and transmits data to the external unit 4. The device 2 also has a voltage regulator 14 which generates a regulated voltage from the current provided by the battery. The regulated voltage is used to supply various circuitry, such as a microcontroller 16, memory (e.g. SRAM) 18 or sensor interface 20. It will be appreciated that the device 2 may include other units not shown in FIG. 1.

Part B of FIG. 1 illustrates an example of the transceiver 12 of the electronic device 2 in more detail. The transceiver 12 has a transmitter 20 with transmitter coil 22 for transmitting data by wireless (radio) communication, receiver front-end 24 with on-chip receiver coil 26 for receiving data by wireless (radio) communication, and an asynchronous transceiver controller (control unit) 28 for controlling the transmitter 20 and the receiver 24. A wakeup oscillator 30 (e.g. a pW-level leakage-based oscillator) is provided for periodically waking up the transceiver controller 28 from a sleep mode to check for data received from the external unit 4. For example, the wakeup oscillator may have a relatively low frequency such as 1 Hz. The transceiver 12 also has a Manchester decoder 34 for decoding Manchester encoded data received by the receiver 24 and a reception buffer 32 for buffering the decoded packets. The transmitter front end 20, receiver front end 24 and Manchester decoder 34 are power gated so that they can be placed in a power saving mode when not being used. The controller 28 and FIFO 32 are not power gated in this example.

Figure 1A:
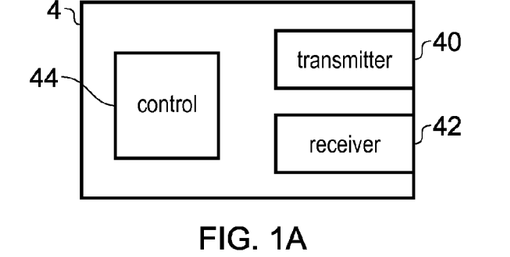
FIG. 1A illustrates an example of an external device for transmitting data to the electronic device.

FIG. 1A shows an example of the external unit 4, which has a transmitter 40 for transmitting data by wireless communication, a receiver 42 for receiving data by wireless communication, and a control unit 44 for controlling the transmitter and receiver.

Figure 2:
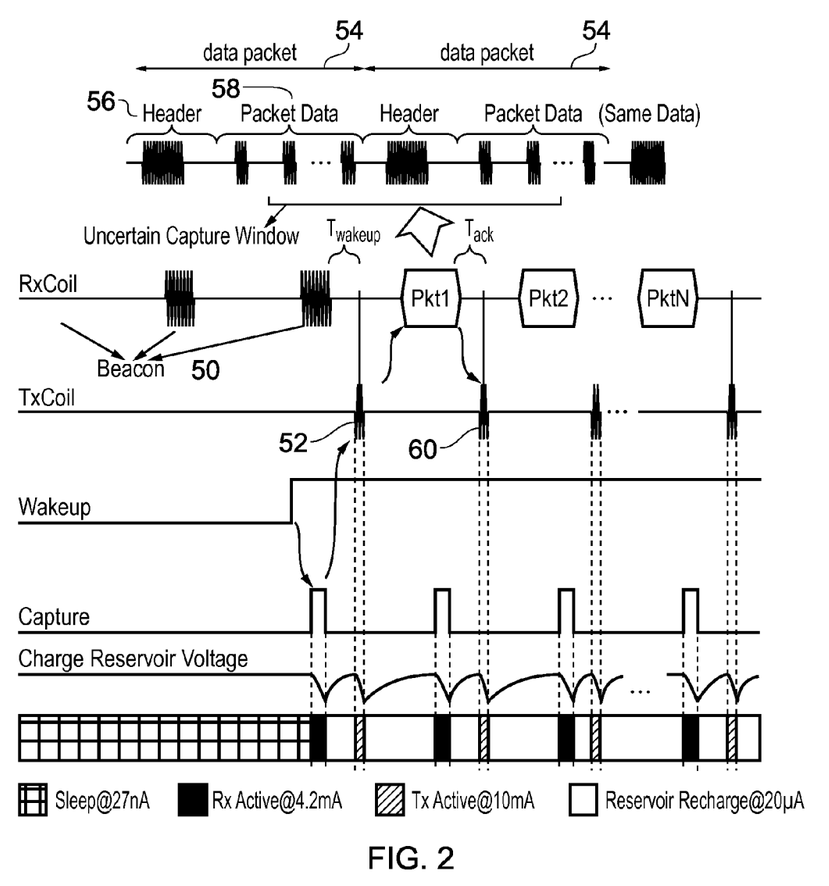
FIG. 2 illustrates an example of a protocol for transmitting packets of data from the external device to the electronic device.

FIG. 2 shows an example of a communication protocol for communicating data packets between the external unit 4 and the electronic device 2. To address the peak output current limitations of highly integrated microsystems, the transceiver uses a new half-duplex protocol that does not require accurate timing to receive data from an external unit. To initiate data transfer, the external unit sends out a beacon 50 (e.g. for 100 ms), after which it ceases transmitting and listens for acknowledgement. The receiver is periodically woken up by a the wakeup oscillator 30. When activated during beaconing by the external unit, the receiver responds after a delay $T_{wakeup}$ by sending an acknowledgement 52 via its on-chip transmitter 20, 22 (which may be tuned at the same frequency as the receiver to re-use spectrum).

In response to the beacon acknowledgement 52, the external unit 4 starts data transmission by sending a payload packet continuously (see the top part of FIG. 2). The data stream sent by the external unit 4 includes the same data packet 54 repeated a number of times. The packet 54 includes a header portion 56 at a predetermined position in the packet (the start of the packet in this example) and packet data 58 representing the contents of the packet. The packet 54 has a predetermined packet length known to the electronic device 2 in advance. The packet data is encoded using Manchester encoding.

After recharging its charge reservoir 8, the receiver 24 wakes up for a short period to capture an amount of data corresponding to the predetermined packet length of one data packet 54, and shuts off immediately after its decoder extracts the Manchester-encoded data from the incoming stream. The decoder finds the beginning of the packet by locating the header and rotating the capture window to restore the original packet 54. By transmitting the same data many times from the external side, uncertainty in the capture window location becomes acceptable, which greatly relaxes constraints on clock jitter in the chip at the cost of increased power consumption in the external unit (typically not constrained). After receiving a packet, the receiver requests the next packet by transmitting a packet acknowledgement 60 after a digitally tunable delay, $T_{ack}$, allowing time for the charge reservoir to recharge. The bottom part of FIG. 2 shows that the charge reservoir 8 is recharged from the battery 6 following each transmission or reception by the transmitter 20 or receiver 24.

In response to the packet acknowledgement 60, the external unit 4 starts transmitting the next packet, and each subsequent packet is transmitted in a similar way to the first packet. After a number of packets have been transmitted, the receiver goes back to the sleep mode. The receiver may switch to the sleep mode after a predetermined number of packets N have been received, after receiving a packet having a header portion indicating that it is the last packet, or when the on-chip FIFO buffer 32 is full, for example. Protocol timing is managed by the asynchronous controller 28, which may be implemented using custom low-leakage high-Vth standard cells to limit total monitoring mode current to 42.7 nA.

Figure 3:
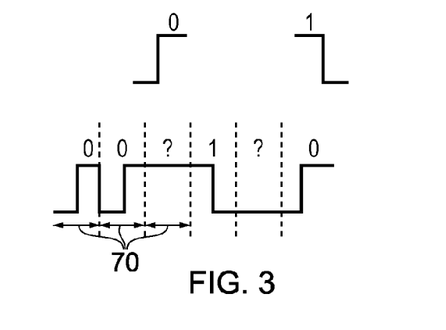
FIG. 3 illustrates Manchester encoding.

The header portion of the data packet may for example use values which are invalid in the Manchester encoding. As shown in FIG. 3, Manchester encoding typically encodes a bit value of 0 using a rising edge transition and a bit value of 1 using a falling edge transition (although it is also possible to use a version of the Manchester encoding which has the opposite mapping so that 0 is indicated by the falling edge and 1 is indicated by the rising edge). Typically the signal is divided into a number of bit periods 70 as shown in FIG. 3 and each bit period 70 includes either a rising transition or a falling transition in the middle of the period depending on whether the encoded bit is 0 or 1. At the boundary between adjacent bit periods there may or may not be a transition, depending on the values being encoded. Hence, the Manchester encoding assumes that there should be a transition during each bit period. Periods without any transition, such as the periods marked with a question mark in FIG. 3, would normally be treated as invalid or trigger an error. Since the invalid values (where the signal stays high or stays low throughout the bit period 70) cannot occur in the data portion 58 of the data packet 54, such invalid values can be used as part of the header 56 so that the header can be distinguished by the decoder 34. Hence, by locating the header in the received packet, the decoder 34 can find the beginning of the packet, and rotate the captured window to return the original packet sent by the external unit 4.

Figure 4:
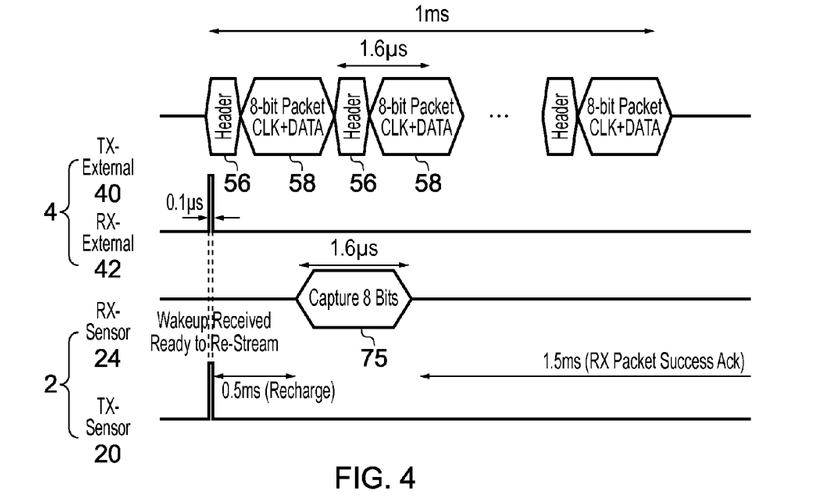
FIGS. 4 and 5 illustrate an example of varying a packet acknowledgement delay to signal whether errors were detected in the received packet.
Figure 5:
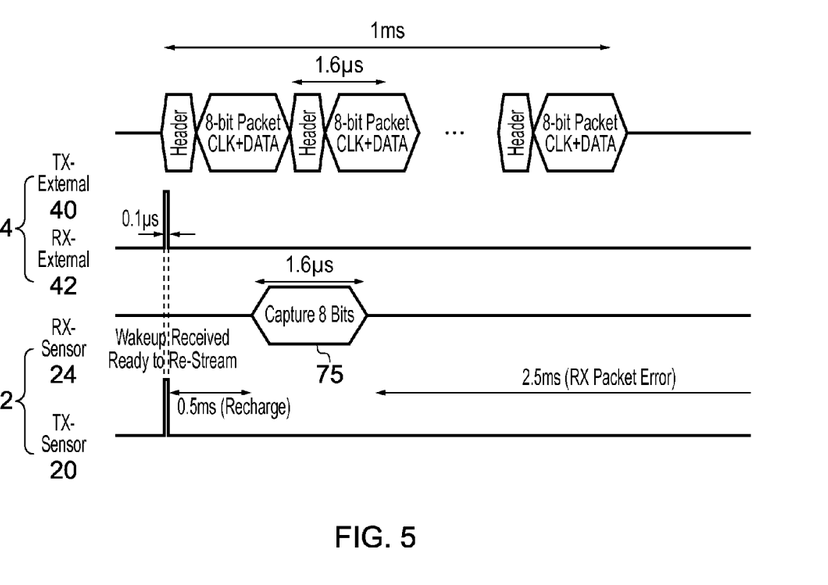

As shown in FIG. 2, the electronic device transmits the packet acknowledgement 60 each time it has received a packet 54. FIGS. 4 and 5 show the protocol in more detail, showing the activity of the transmitter 40 and receiver 42 of the external unit 4 as well as the transmitter 20 and receiver 24 of the electronic device 2. The block 75 of data captured by the receiver 24 of the electronic device 2 may occur at any arbitrary timing relative to the stream of data sent by the external unit 4, so that no accurate timing synchronisation is required. Note that in FIGS. 4 and 5, the length of the data transmission from the external device 4 is much longer (1 ms) than the length of an individual packet (1.6 µs) to relax the timing constraints at the transceiver 12.

As shown in FIGS. 4 and 5, there may be a delay between the electronic device 2 receiving the packet and transmitting the acknowledgement and the delay period can be modified to signal information such as whether or not there is an error. As shown in FIG. 4, if the data packet 54 is successfully received based on a captured block of data, then a first delay period (e.g. 1.5 milliseconds) may elapse before the transmitter 20 transmits the acknowledge signal 60, which triggers the external unit 4 to respond with the next packet of data. In contrast, as shown in FIG. 5, if an error occurs (for example, one of the invalid values of the Manchester encoding occurs within the captured data), then the controller 28 waits longer before controlling the transmitter 20 to send the packet acknowledgement signal 60 (e.g. with a delay of 2.5 milliseconds within this example). The extended delay period may be long enough so that, regardless of the timing of the receiver capture window relative to the data stream transmitted from the external unit 4, the external unit 4 can distinguish the longer delay period of FIG. 5 from the shorter delay period of FIG. 4. The longer acknowledgement delay signals to the transmitter that the packet has not been successfully received and so the external unit 4 then resends the original packet. If errors continue to occur then after a certain number of unsuccessful retries (e.g. 8 retries), then the receiver may go to sleep and wait for wakeup controller 30 to wake it up again. Hence, the acknowledgement delay period may be used to signal information to the external unit 4 so that there is no need for any circuitry 4 modifying the contents of the acknowledgement signal.

Figure 6:
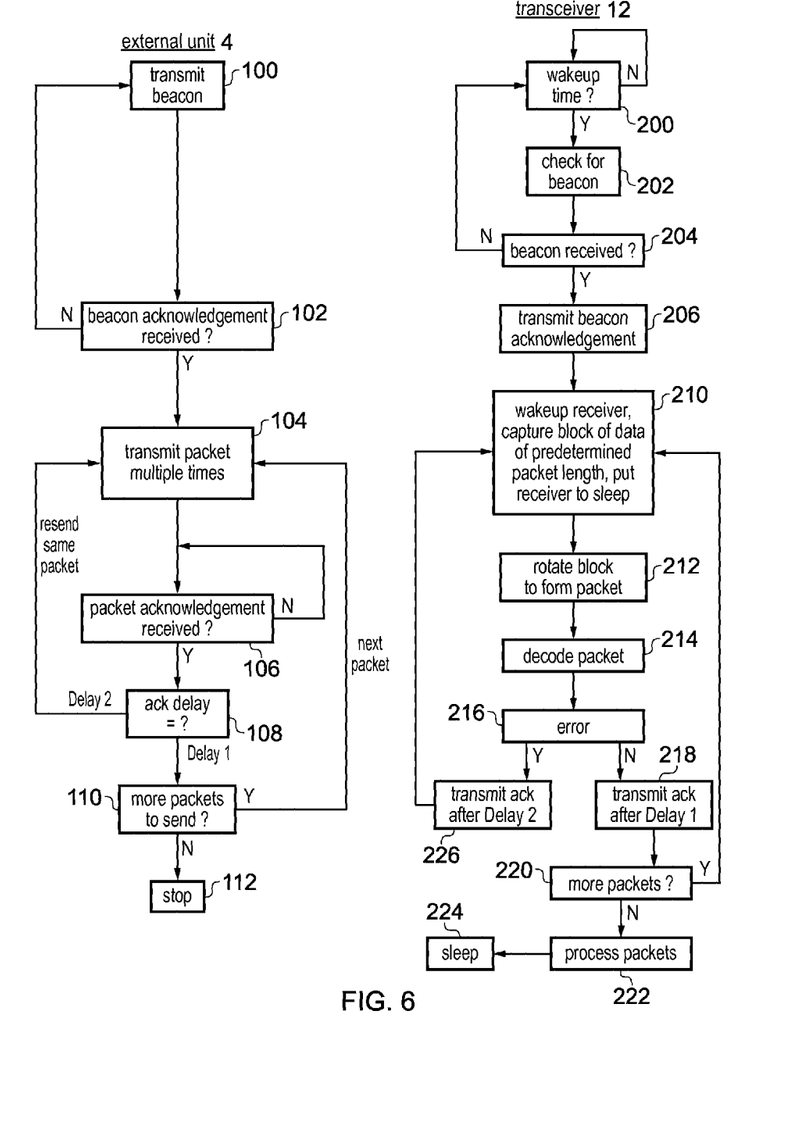
FIG. 6 illustrates a method of transmitting packets of data from an external unit to an electronic device.

FIG. 6 shows a method of communicating between the external unit 4 and the transceiver 12 of the electronic device 2. The left hand part of FIG. 6 shows the operation of the external unit 4 and the right hand part shows the operation of the transceiver 12. At step 100, the external unit 4 transmits a beacon 50 and at step 102 checks whether a beacon acknowledgement 52 has been received. If no beacon acknowledgement 52 is received then the external unit 4 continues periodically transmitting beacons to signal that it wishes to communicate with the electronic device 2.

Meanwhile, at step 200 the wakeup controller 30 determines whether or not it is time to wake up the controller 28 to check for beacons. If not, then the transceiver remains in the sleep mode. When the wakeup time elapses, the transceiver 12 is powered up and at step 202 the receiver 34 detects whether a beacon has been received. If no beacon is received, then the method returns to step 200 to wait for the next wakeup time. When a beacon is received, the method proceeds to step 206 where a beacon acknowledgement signal 52 is transmitted to the external unit 4. There is a delay between receiving the beacon at step 204 and transmitting the beacon acknowledgement at step 206, to allow the charge reservoir 8 to be charged sufficiently to operate the transmitter 20. Having received the beacon acknowledgement 52 at step 102, the external unit transmits a packet of data multiple times in a continuous stream of data at step 104. The external unit 4 then waits for a packet acknowledgement message to be received at step 106.

Meanwhile, having recharged the charge reservoir 8 following transmission of the beacon acknowledgment 52 at step 206, at step 210 the controller 28 wakes up the receiver 24 and controls the receiver 24 to capture a block of data having the predetermined packet length, before putting the receiver 24 to sleep again. The controller 28 and receiver 24 do not attempt to locate the header portion 56 of the packet before capturing the block of data, and instead simply capture a continuous block of data of the predetermined size without trying to align the capture window with the packet in the transmitted stream. At step 212, the Manchester decoder 34 rotates the received block of data to position the header at the required position (e.g. at the start of the packet). For example, a ring buffer or circular shift operation may be used to rotate the block of data. At step 214, the rotated packet is decoded by the Manchester decoder 34 to generate a series of 0s and 1s in binary representation. At step 216 the decoder 34 determines whether an error is detected in the decoded packet. If there is no error then at step 218 the controller 28 controls the transmitter 20 to transmit the packet acknowledgment 60 after a first acknowledgement delay period has elapsed (in the meantime, the charge reservoir 8 is replenished). At step 220 it is determined whether there are any more packets to be received and if so the method returns to step 210. If there are no more packets then at step 222, the transceiver 12 enters a power saving mode, and the received packets are processed by the micro controller 16 and once these are processing then at step 224 the device 2 is put to sleep again to await wakeup once more. Meanwhile, on detecting the packet acknowledgement 60 from the device 2, at step 108 the external unit 4 checks the delay period between sending the stream of data and receiving the packet acknowledgment. As the delay period in this instance is the first delay period, it is determined that the packet was successfully received. At step 110 the external unit determines whether there are more packets to send, and if so then the method returns to step 104 to transmit the next packet several times in a stream of data. If there are no more packets, then at step 112 the method stops.

On the other hand if the Manchester decoder 34 detects an error at step 216, then at step 226 the controller 28 controls the transmitter to transmit the packet acknowledgement after a second delay period has elapsed, to signal that the same packet should be sent again, and the electronic device 2 returns to step 210. At the external unit 4, if at step 108 it is determined that the delay period is the second delay period, then the method returns to step 104 to resend the same packet.

Figure 7:
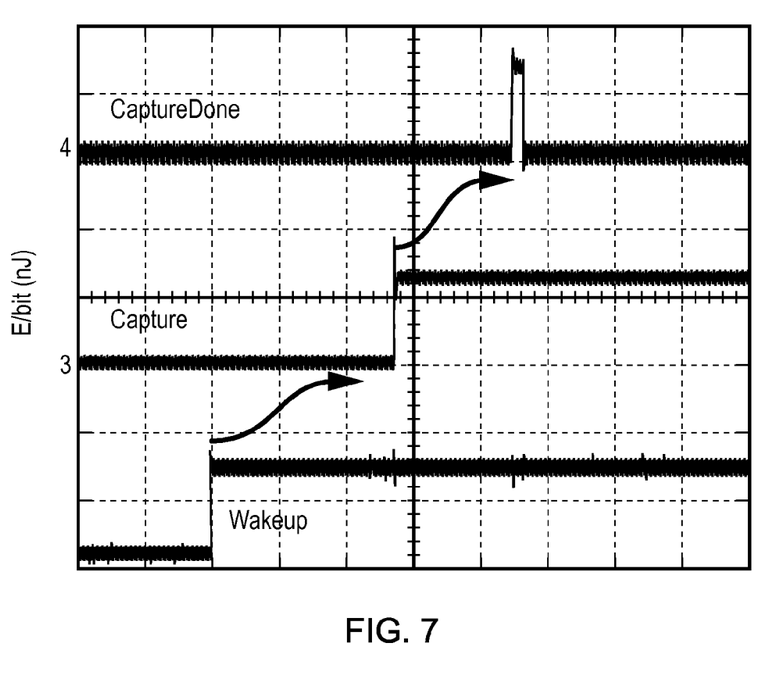
FIG. 7 illustrates the operation of the electronic device.
Figure 8:
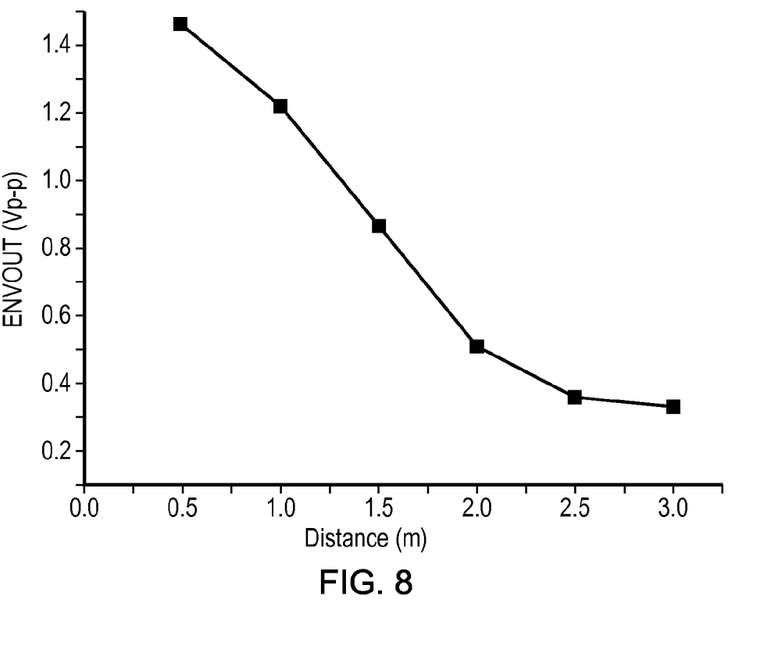
FIG. 8 is a graph showing the reception range of the receiver.

The transceiver discussed above has been fabricated in 0.18 μm CMOS and in the fabricated example occupies 2.5 mm² core area. It consumes 71.6 μW of active power at 40.7 kbps and reliably receives data from a 2 W source positioned 1 m away. It has been found that the front-end chain 24 can easily amplify signals at distances up to 1 m (see FIG. 8). The transceivers two 1.7×1 mm coils have Q≈4 and provide sufficient magnetic moment to couple to transmitters up to 1 m away. In the active power breakdown, energy/bit becomes dominated by digital power at high bitrates. FIG. 7 provides an oscilloscope shot of the wakeup-capture-capture-done sequence.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An electronic device comprising:
   a receiver that communicates with an external device, wherein the receiver receives a data stream from the external device, wherein the data stream includes a plurality of data packets including a data packet sequentially repeated a plurality of times, and wherein each data packet has a predetermined packet length and a header portion at a predetermined position within each data packet;
   a transmitter that communicates with the external device;
   a control unit that controls the receiver to detect a beacon transmitted from the external device, the beacon signaling that the external device is ready to transmit, wherein in response to detecting the beacon, the control unit controls the transmitter to transmit a beacon acknowledgement to the external device to signal that the electronic device is ready to receive the data packet in the data stream, wherein the control unit further controls the receiver to capture a block of data from the data stream, and wherein the captured block of data has the predetermined packet length and the header portion; and
   a decoder that restores the data packet from the captured block of data by locating the header portion of the data packet within the captured block of data and rotating the captured block of data to place the header portion at the predetermined position within the data packet.

2. The electronic device according to claim 1, wherein the receiver has an active state for receiving the data stream from the external device and a power saving state in which the data stream cannot be received from the external device; and
   the control unit is configured to control the receiver to switch from the power saving state to the active state, capture the block of data having the predetermined packet length from the data stream transmitted by the external device, and switch back to the power saving state.

3. The electronic device according to claim 1, wherein the control unit is configured to control the transmitter to transmit a packet acknowledgement to the external device to signal that the original data packet has been received.

4. The electronic device according to claim 3, wherein the transmitter has an active state for transmitting the data stream to the external device and a power saving state in which the data stream cannot be transmitted to the external device; and
   the control unit is configured to control the transmitter to switch from the power saving state to the active state, transmit the packet acknowledgement, and switch back to the power saving state.

5. The electronic device according to claim 3, wherein the packet acknowledgement is for triggering the external device to transmit a second data stream comprising a second data packet repeated a plurality of times, the second data packet having the predetermined packet length and comprising the header portion at a predetermined position within the second data packet; and after controlling the transmitter to transmit the packet acknowledgement, the control unit is configured to control the receiver to capture a second block of data having the predetermined packet length from the second data stream.

6. The electronic device according to claim 3, wherein the control unit is configured to control the transmitter to delay transmitting the packet acknowledgement to the external device until a delay period has elapsed after receiving the original data packet.

7. The electronic device according to claim 6, wherein the control unit is configured to vary the duration of the delay period to signal information to the external device.

8. The electronic device according to claim 6, wherein the decoder is configured to detect errors in the received original data packet; wherein the delay period has a first duration if no errors are detected in the received original data packet; and wherein the delay period has a second duration if at least one error is detected in the received original data packet.

9. The electronic device according to claim 1, wherein the header portion has a unique value which cannot occur in the remainder of the original data packet.

10. The electronic device according to claim 1, wherein the data stream comprises Manchester encoded data, and the decoder comprises a Manchester decoder for decoding the Manchester encoded data.

11. The electronic device according to claim 1, wherein the electronic device has an active mode and a sleep mode; and the electronic device comprises a wakeup controller configured, when the electronic device is in the sleep mode, to control the electronic device to periodically switch to the active mode, detect whether the beacon has been transmitted from the external device, and if no beacon is detected, switch back to the sleep mode.

12. The electronic device according to claim 1, comprising a charge reservoir configured to supply power to the receiver.

13. The electronic device according to claim 12, comprising a battery, wherein the charge reservoir is configured to be recharged using power supplied by the battery.

14. The electronic device according to claim 13, wherein the control unit is configured to control the charge reservoir to be recharged from the battery after reception of the data stream by the receiver.

15. An electronic device comprising:
receiving means for communicating with an external device, wherein the receiving means receives a data stream from the external device, wherein the data stream includes an original data packet sequentially repeated a plurality of times, and wherein the original data packet has a predetermined packet length and a header portion at a predetermined position within the original data packet;
transmitting means for communicating with the external device;
control means that controls the receiving means to detect a beacon transmitted from the external device, the beacon signaling that the external device is ready to transmit, wherein in response to detecting the beacon, the control means controls the transmitting means to transmit a beacon acknowledgement to the external device to signal that the electronic device is ready to receive the data stream, wherein the control means further controls the receiving means to capture a block of data from the data stream, and wherein the captured block of data has the predetermined packet length and the header portion; and
decoding means for restoring the original data packet from the captured block of data by locating the header portion of the original data packet within the captured block of data and rotating the captured block of data to place the header portion at the predetermined position within the original data packet.

16. A device, comprising:
a receiver that communicates with an electronic device;
a transmitter that communicates with the electronic device; and
a control unit that controls the receiver and the transmitter,
wherein the control unit controls the transmitter to transmit a beacon,
wherein the control unit controls the receiver to receive a beacon acknowledgment in response to transmitting the beacon, and
wherein the control unit controls the transmitter to transmit a data stream in response to receiving the beacon acknowledgement, the data stream having an original data packet repeated a plurality of times, the original data packet having a predetermined packet length and a header portion at a predetermined position within the original data packet.

17. A device, comprising:
receiving means for communicating with an electronic device;
transmitting means for communicating with the electronic device; and
control means for controlling the receiving means and the transmitting means,
wherein the control means controls the transmitting means to transmit a beacon,
wherein the control means controls the receiving means to receive a beacon acknowledgment in response to transmitting the beacon, and
wherein the control means controls the transmitting means to transmit a data stream in response to receiving the beacon acknowledgement, the data stream having an original data packet repeated a plurality of times, the original data packet having a predetermined packet length and a header portion at a predetermined position within the original data packet.

18. A method, comprising:
employing an external device for:
transmitting a beacon to the electronic device,
receiving a beacon acknowledgement from the electronic device, and
transmitting a data stream to the electronic device after receiving the beacon acknowledgement from the electronic device, the data stream having an original data packet repeated a plurality of times, the original data packet having a predetermined packet length and a header portion at a predetermined position within the original data packet; and
employing an electronic device for:
receiving the beacon from the external device,
transmitting the beacon acknowledgement to the external device in response to receiving the beacon, capturing a block of data from the data stream, wherein the captured block of data has the predetermined packet length and the header portion, and restoring the original data packet from the captured block of data by locating the header portion of the original data packet within the captured block of data and rotating the block of data to place the header portion at the predetermined position within the original data packet.

19. The electronic device according to claim 1, wherein the electronic device is an implantable device.

20. The transmitting device according to claim 16, wherein the electronic device is an implantable device.

* * * * *